G. O. GRIDLEY.
MULTIPLE SPINDLE MACHINE.
APPLICATION FILED DEC. 15, 1911.
1,166,830.
Patented Jan. 4, 1916.
7 SHEETS—SHEET 4.
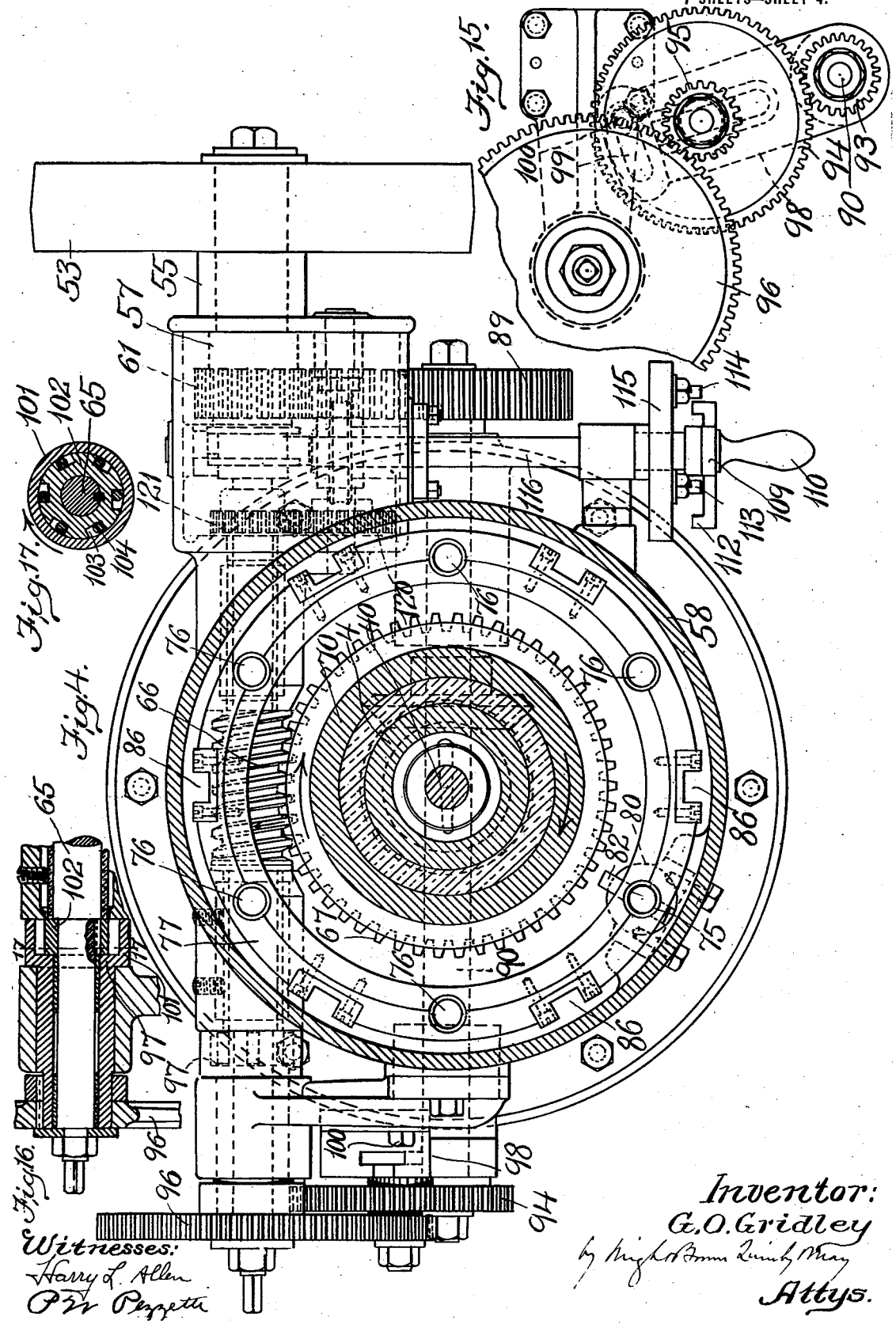
Inventor:
G. O. Gridley

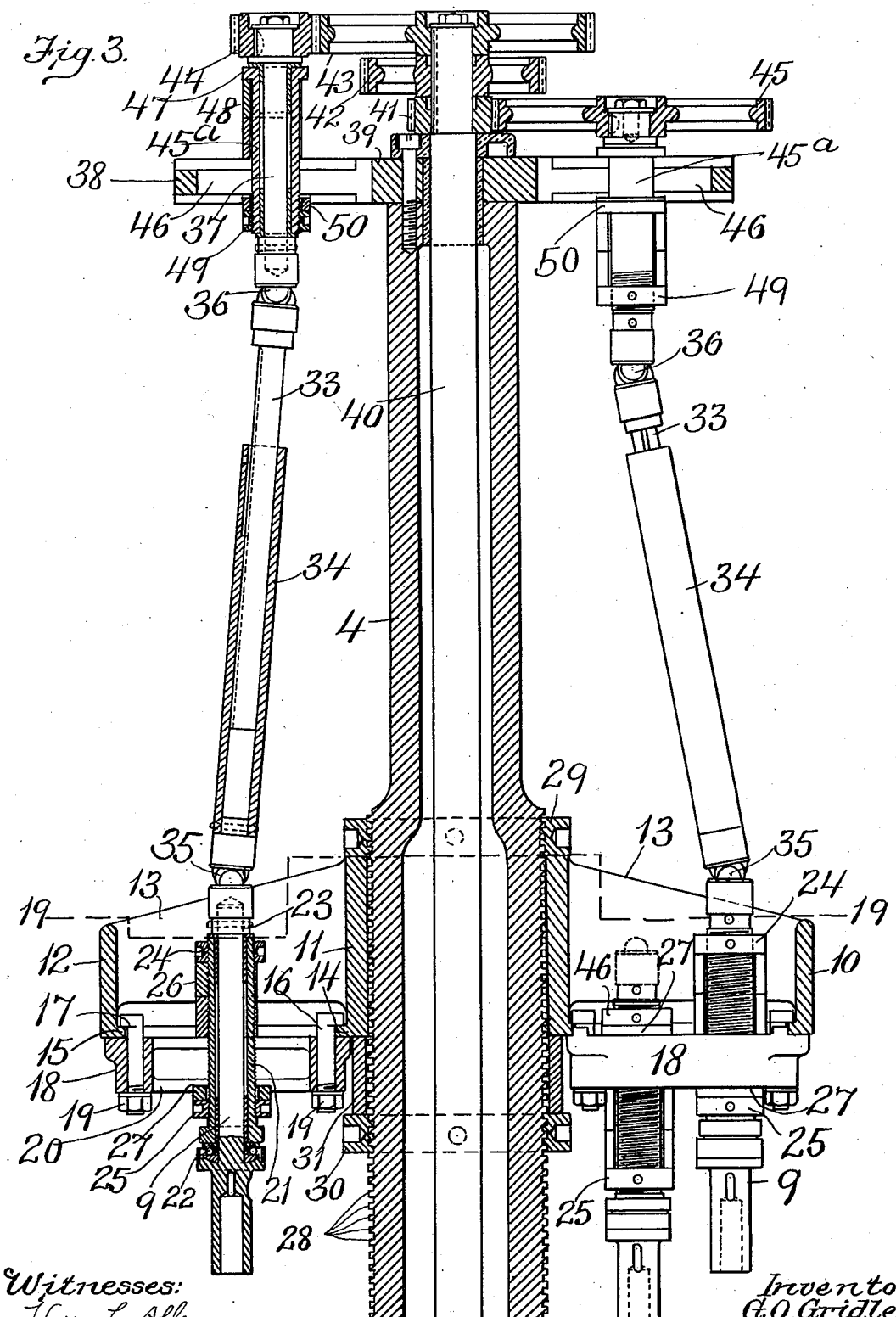

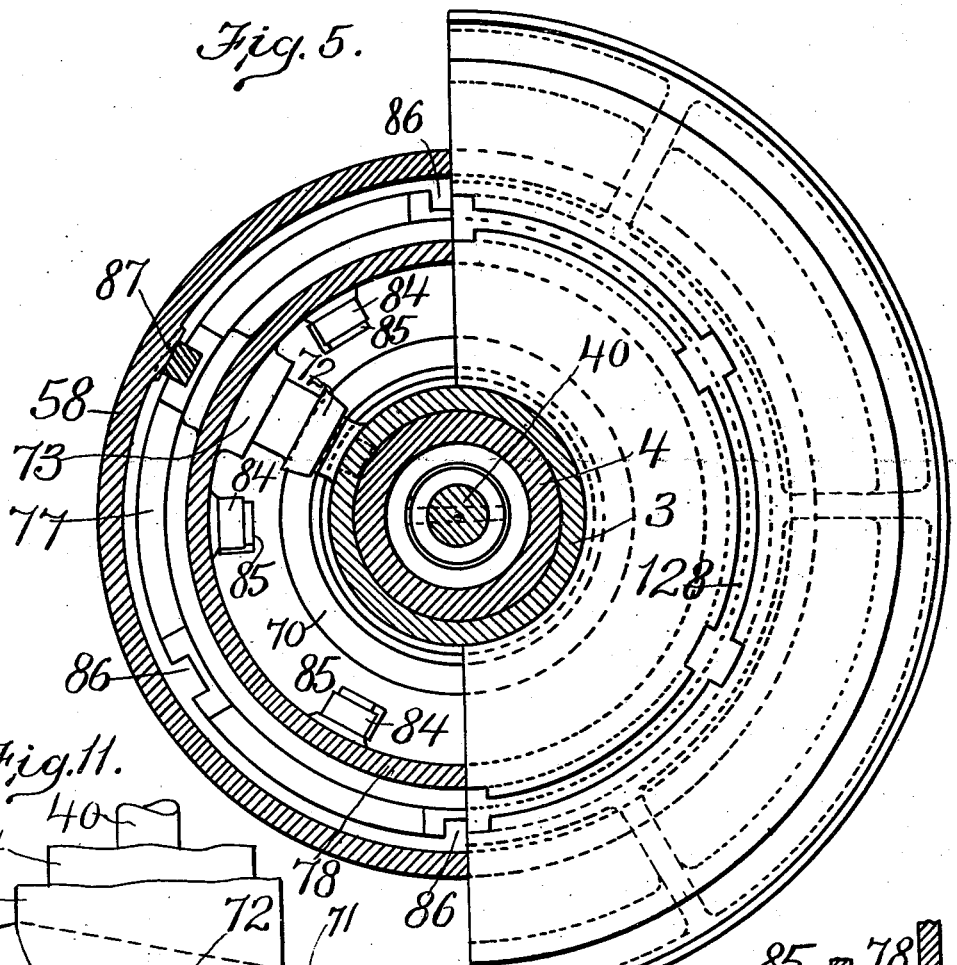
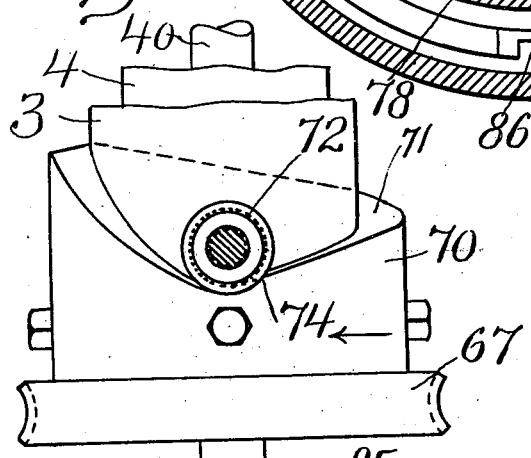
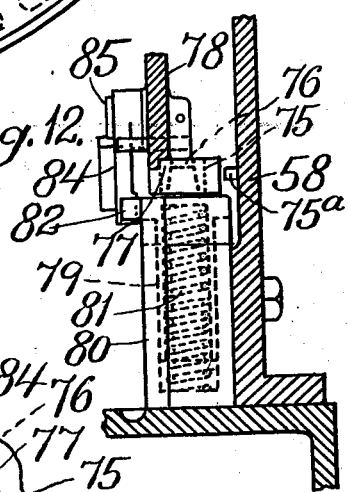
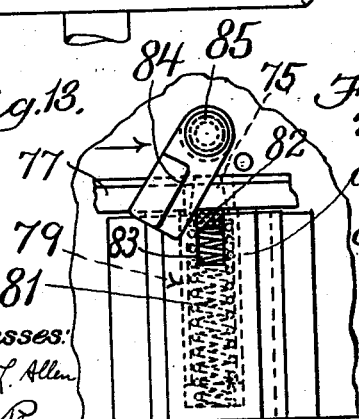
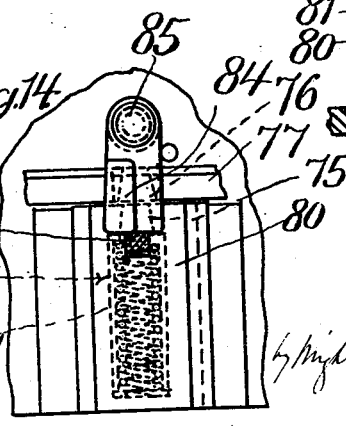

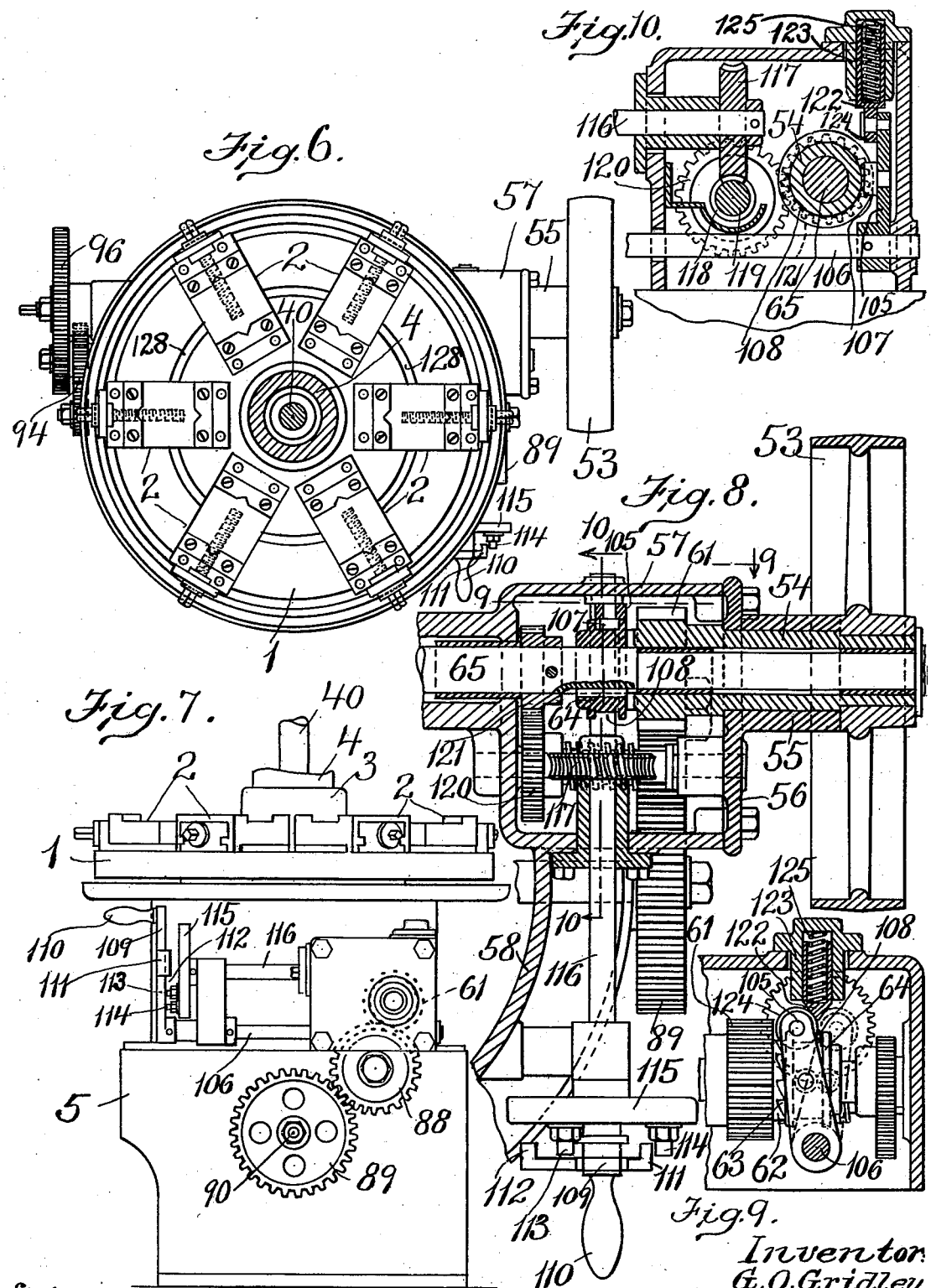

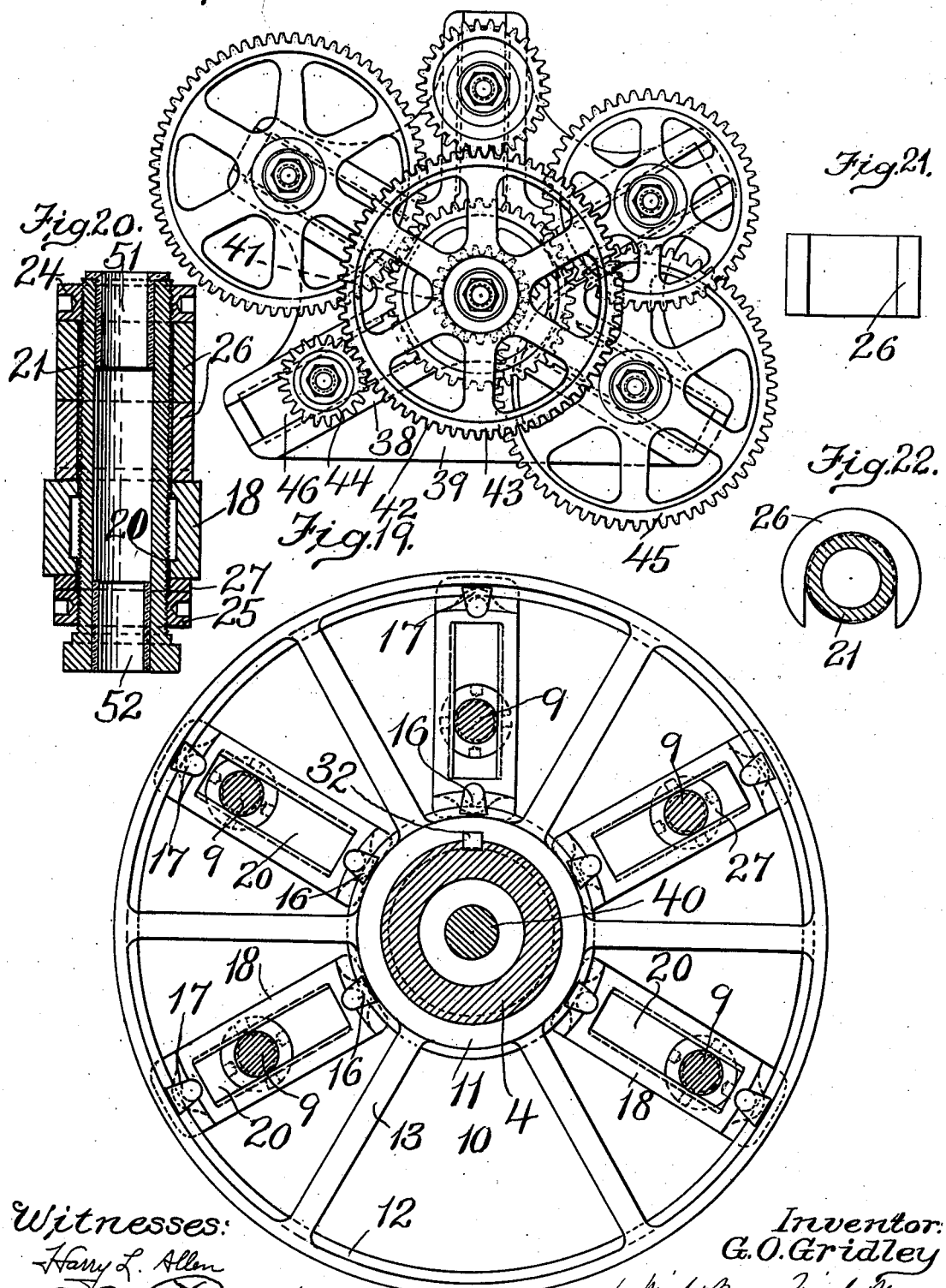

UNITED STATES PATENT OFFICE.

GEORGE O. GRIDLEY, OF WINDSOR, VERMONT.

MULTIPLE-SPINDLE MACHINE.

1,166,830.      Specification of Letters Patent.      Patented Jan. 4, 1916.

Application filed December 15, 1911. Serial No. 666,066.

*To all whom it may concern:*

Be it known that I, GEORGE O. GRIDLEY, of Windsor, in the county of Windsor and State of Vermont, have invented certain new and useful Improvements in Multiple-Spindle Machines, of which the following is a specification.

This invention relates to machine tools and has for its primary object to provide in a tool of this character means by which a number of work pieces may be simultaneously acted upon by a number of tools and individual work pieces may be acted upon by a number of tools in succession to perform a connected series of operations, together with means whereby the several tools may be adjusted or set so that all act upon the same work piece either at the same point or common center, or at points or centers at any desired distance in any desired direction out of such common point or center.

Other objects of the invention appear from the following detailed description and the appended claims.

In the accompanying drawings I have illustrated a machine tool embodying the principal features of my invention in practical form.

Figure 1:
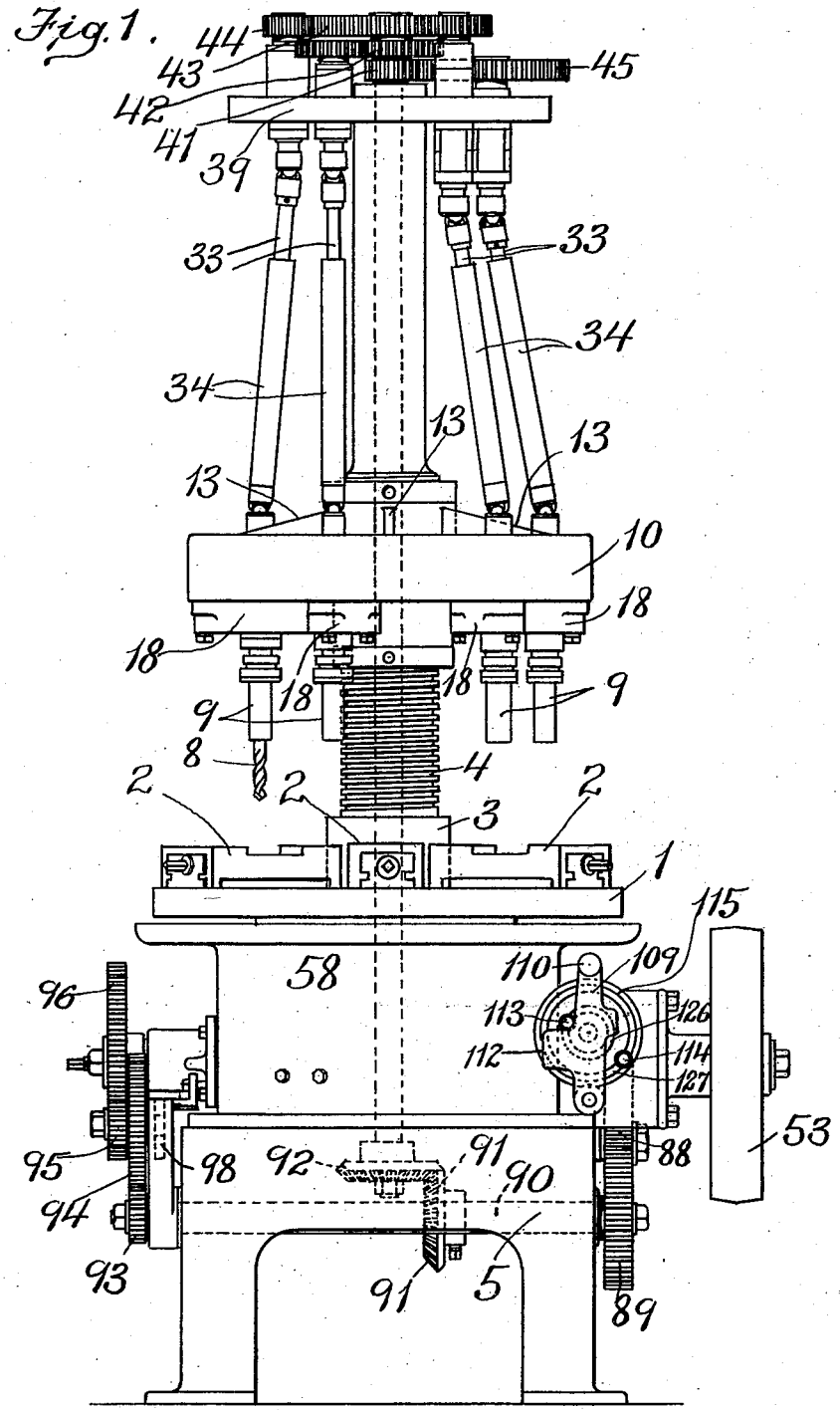
Figure 2:
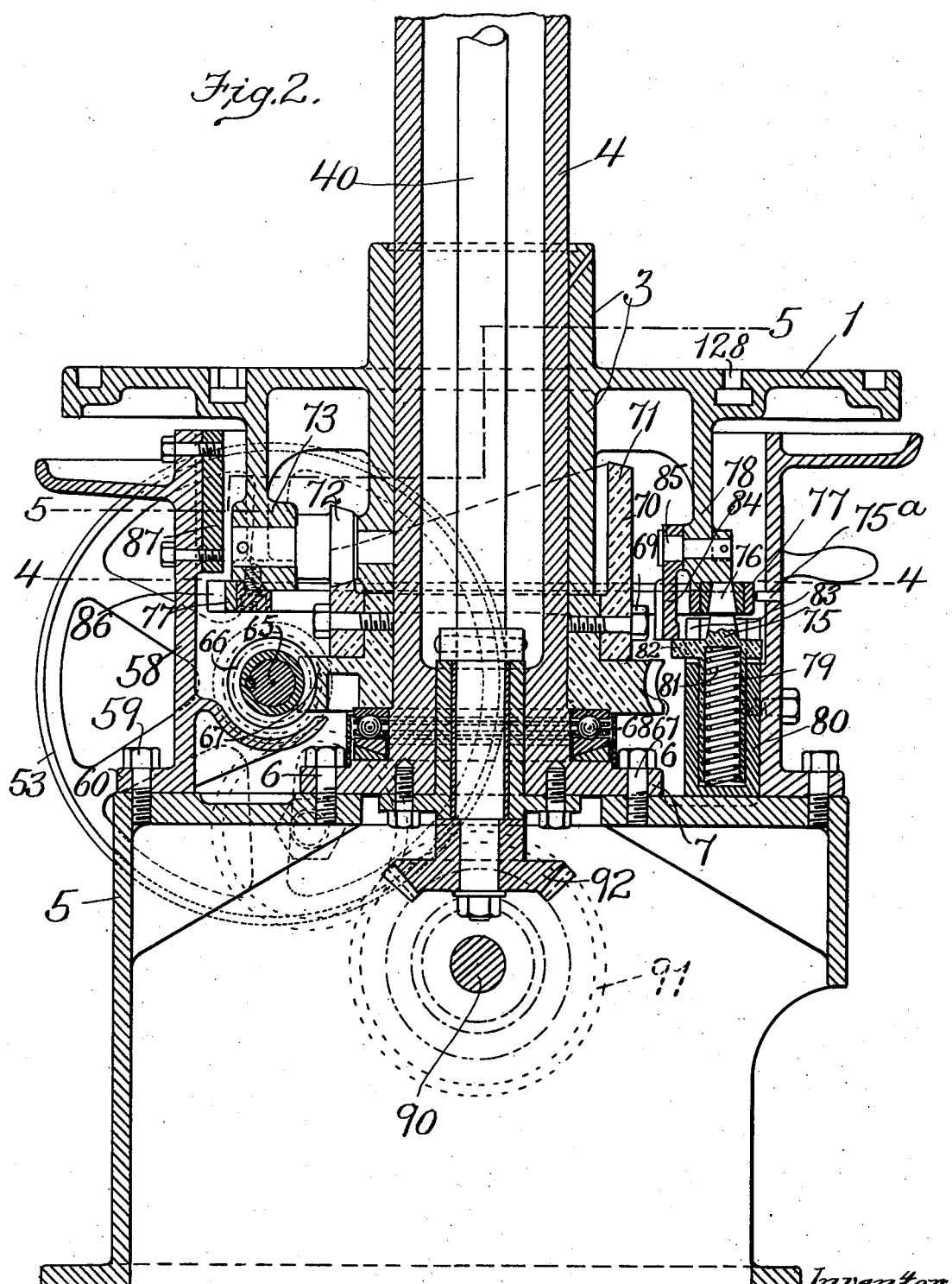

In the drawings, Figure 1 is a front elevation of the machine. Fig. 2 is a vertical section on a larger scale of the lower part of the machine. Fig. 2 is a vertical section on the same scale as Fig. 2 of the top part of the machine. Fig. 4 is a horizontal cross-section on line 4—4 of Fig. 2. Fig. 5 is a partial plan view and partial section on line 5—5 of Fig. 2. Fig. 6 is a plan view of the table which constitutes the work-holder. Fig. 7 is a side elevation of the lower part of the machine, as seen from the right of Fig. 1. Fig. 8 is a sectional plan view of part of the driving mechanism. Fig. 9 is a sectional elevation on line 9—9 of Fig. 8. Fig. 10 is a vertical sectional view on line 10—10 of Fig. 8. Fig. 11 is an elevation of the machine element by which the work-holding table is driven. Fig. 12 is an elevation of the stop for the table and the means for disengaging said stop. Figs. 13 and 14 are elevations of the parts shown in Fig. 12 as seen from the left of such figure, illustrating the manner in which the stop is controlled. Fig. 15 is a detail elevation of part of the driving gearing of the machine. Fig. 16 is a horizontal sectional view of one of the clutches forming a part of this driving gear. Fig. 17 is a cross-section of this clutch on line 17—17 of Fig. 16. Fig. 18 is a plan view of the gearing for driving the operating tools. Fig. 19 is a cross-section on line 19—19 of Fig. 3, showing the spindle-holding head in plan. Fig. 20 is an enlarged sectional view of one of the tool spindle bearing sleeves. Figs. 21 and 22 show in elevation and plan respectively one of the spindle fill washers.

The same reference characters indicate the same parts in all the figures.

Referring first to Figs. 1, 2 and 3, 1 represents a table constituting a work-holder or work-carrier, and having a number of work grippers 2 of any suitable character. The table has a hub or sleeve 3 extending above and below the plane of the table, making a sliding fit with a column 4 which rises from a pedestal base 5, to the central part of which it is secured by bolts 6, as shown in Fig. 2, the column having a flange 7 through which the bolts pass. The table is enabled to rotate about the column 4 and also to slide up and down thereon, and the sleeve 3 has a sufficiently long bearing surface to maintain the table horizontal without binding.

The column 4 supports one or more tools 8, such as drills, or other rotatably acting tools, above the work table. Each of these tools is carried by a rotating tool spindle 9 and the spindles are all supported by tool holder consisting of a frame or head 10 which includes a hub 11 fitting the column, an outer ring 12, and radial ribs 13 connecting the hub and rim. The hub and rim have lips 14 and 15 respectively, from which are hung by means of clamp hooks 16 and 17 at their opposite ends, spindle guides 18. The clamp hooks have nuts 19 by which they may be tightened. The spindle guides have passages 20 through which pass sleeves 21 containing the tool spindles 9. Each of the latter is contained in one of the sleeves and is adapted to rotate therein, the thrust of the tool being borne by a ball bearing 22 at the lower end of the sleeve, and the spindle being prevented from dropping out by a collar 23 at the upper end of the sleeve. Each spindle is adapted to be moved lengthwise of the guide slot 20 and thereby radially toward or from the column, and to be clamped in any position of adjustment by means of nuts 24 and 25, threaded upon the sleeve, between which and the guide are filling pieces 26 and a washer 27. Said nuts constitute adjustable fixed abutments on the spindle, the washer 27 being part of the abutment constituted by the nut 25. The spindle and its sleeve may be raised or lowered and set in any position by putting one or more of the filling pieces or washers above or below the guide 20, and between the guide and either or both of said abutments.

Fig. 3 shows three possible positions of the tool spindles, and shows also that in any of these positions the spindle sleeve is securely held. The filling pieces are made open at one side, as shown in Fig. 22, so that they may be easily slipped on and off the sleeve. More positions of the tool spindles are made possible by having more and thinner filling pieces, or by making the filling pieces of different heights. The tool spindles may also be adjusted around the column by shifting the guides 18 to different positions on the lips 14 and 15, in any of which positions they may be secured by the clamp hooks 16 and 17. Thus any tool spindle can be shifted in any direction horizontally so that it may act at any point upon the work piece held by the table beneath, and it may also be adjusted independently of the other tool spindles toward or from the work pieces.

In addition I provide for adjusting all of the spindles simultaneously toward or from the table. To this end the hub of the spindle head is made to slide up and down on the column, and the latter is provided with screw threads 28 which are engaged by nuts 29 and 30 above and below the hub of the head. Between the latter and the lower nut is a sleeve or washer 31 which extends from the hub below the guides 18. The hub is provided with a key 32 (see Fig. 19) which slides in a keyway in the column to prevent the head from turning while being adjusted, or at other times.

The driving means for the tool spindles includes flexible and extensible shafting to permit of the adjustments described. Such shafting for each spindle consists of a rod 33 and a sleeve 34 keyed or splined together, and together forming a telescopic shaft. The sleeve is connected by a universal joint 35 with the tool spindle, and the rod is connected by a similar universal joint 36 with a driving spindle 37. The latter is secured in one of the arms 38 of a head or spider 39 secured at the top of the column above the head 10. There are as many driving spindles 37 as there are tool spindles, and all derive motion from a shaft 40 extending through the column 4 and beyond the spider 39. Various speeds of rotation may be given to the spindles 37 and through them to the tool spindles, and for that purpose pinions or gears 41, 42 and 43 of the same or different sizes are secured upon the shaft 40 one above another. Pinions 44 and gears 45 of any desired sizes are secured detachably and interchangeably upon the drive spindles 37. Such spindles are adjustable vertically and also radially in the arms of the spider to enable the change gears of any size thereon to be placed in mesh with any of the gears on the shaft 40. To permit of these adjustments the spindles 37 are contained in sleeves 45ª which pass through radial guides 46 in the spider arms 38. Each sleeve has an abutment formed by a lip 47 at its upper end and is sufficiently long to permit insertion between the lip and the spider arm of filling washers 48 to elevate its pinion 44 to the height of the uppermost gear 43 on the shaft. A nut 49 on the sleeve below the arm forms the opposite abutment which clamps the sleeve and spindle in all its adjustments, acting through a washer 50. By putting one or more of the filling washers 48 between the lower side of the spider arm and the nut 49, the sleeve may be held with its gear in the plane of either of the drive shaft gears.

One of the tool spindle sleeves 21 is illustrated in Fig. 20, in its relation with the guide 18 and the filling pieces, washer and nuts. The sleeve has in its opposite ends bushings 51 and 52 which provide the bearing surfaces for the spindles. The sleeves 45 for the driving spindles with their associated parts are practically like this sleeve, with the exception that they have lips 47 instead of the upper nut 24, on account of the fact that such minute adjustments of height are not required.

I will now describe the mechanism which serves to rotate and feed the work table, and the mechanism for rotating the shaft 40 and the work spindles.

The prime driving element of the machine is a pulley 53 to which power is delivered by a belt or equivalent means. This pulley is keyed or otherwise secured upon a sleeve or quill 54 (see Fig. 8), which turns in a bearing 55 formed upon the cover 58 of a gear box 57 which forms part of a casing 58 (shown best in Fig. 2) secured upon the pedestal 5 by means of nuts 59 and a flange 60, and inclosing all the driving mechanism of the machine. On the inner end of the quill 54 and within the box 57 is a pinion gear 61, which also has on its inner face a clutch 62 which is adapted to coöperate with the teeth 63 of a complemental clutch 64. The latter is keyed to, and slides upon, a shaft 65, which passes through the quill 54, the gear box 57, and into the casing 58. Said shaft carries a worm 66 meshing into a worm wheel 67 surrounding and having a bearing on the column 4. The weight of the worm wheel and of the parts supported upon it is borne by a ball bearing 68 interposed between the wheel and the base flange 7 of the column. The worm wheel is below the sleeve 3 of the work table and has a hub portion which is surrounded by, and to which is secured by bolts 69, a sleeve cam 70. Such cam also surrounds the sleeve 3 of the table, and has its cam surface on its upper edge 71. A roll 72 is carried by the table between the sleeve 3 thereof and a bracket 73, and bears on the cam surface 71. As shown in Fig. 11 the cam surface has a slight shoulder 74 at one side of its lowest point, which is sufficiently high to prevent the roll from rising with the weight of the table and work when the cam is rotated. Thus rotation of the cam causes the table and work-holders to rotate also so as to place the various work-holders in different positions with respect to the several tools. However, when the table is by any means prevented from rotation, the shoulder 74 and the adjacent rising cam surface pass under the roll 72 and the table and work are thereby caused to rise against the resistance of gravity.

For the purpose of arresting the rotation of the table at the proper times, I provide the table with abutments equal in number to the work-holders, and arrange a stop 75 to coöperate with these abutments. The abutments are provided by the sides of recesses 76 formed in a ring 77 which is secured to the under side of the bracket 73 and to one or more other brackets, or a flange, 78, projecting downward from the under side of the work table. Conveniently the recesses are made in separate hardened thimbles or bushings set into the ring 77 for reasons relating to practical construction, but essentially the ring is a part of the work-holding table 1 and the abutments formed by the sides of such recesses are parts of such work-holder.

The stop 75 is made in part as a pin adapted to fit into any one of the recesses 76, and in part as a sleeve 79 adapted to slide in a socket or guide 80 which presses the stop yieldingly against the under side of the ring 77. On the stop is a projection 82, projecting through a guide notch 83 in the socket 80, the purpose of which is to enable the stop to be disengaged from the recesses. Pivoted to the flange 78 beside the several recesses 76 are pawls 84, one of which is shown in operative position in Fig. 2. The pawls are adapted to hang by gravity vertically from their pivotal studs 85, and normally their ends hang somewhat below the level of the projection 82. When, in the rotation of the table, one of the recesses 76 approaches the stop 75, and one of the pawls approaches the projection 82, as shown in Fig. 13, the stop is constantly held against the under side of the ring 77 by spring 87 with a yielding pressure, and enters a recess 76 as soon as the latter is over it, the projection 82 swinging the pawl aside. Thereupon rotation of the work table is stopped.

Continuing to rotate, the cam passes under the roll 72, raising the table and feeding the work toward the tools. As soon as the table has risen slightly, a notch 86 in the ring 77 embraces a stationary vertical guide 87 secured to the casing 58. There are as many notches 86 in the ring as there are recesses 76, and so spaced that whenever one of the recesses is over the stop 75, one of the notches is under the guide 87. The stop rises with the table until arrested by a stud 75$^a$, and keeps the notch in accurate alinement with the guide until it embraces the latter. The guide, which fits accurately in the notch 86, holds the work in proper relation to the tools during the entire feed and return movements of the table. At the end of the return movement the pawl 84 which, as soon as the table has risen slightly, has returned to its vertical position, strikes the projection 82, depresses it, and so depresses the stop 75 below the mouth of the recess 76, thus making the stop inoperative, or, in other words, disabling it. These parts then occupy the position shown in Figs. 2 and 14. The table now resumes its rotation under the impulse applied by the cam shoulder 74, and the pawl is soon released from the stop 75, which rises to the ring 77, ready to enter the next recess 76. In this way the same driving element automatically indexes the work carrier to bring the several work pieces into alinement with the several tools successively, and feeds the work up to the tools, in the proper alternating sequence. At the same time the tool spindles are rotated by the pulley 53 and pinion 61 acting through an idle gear 88 (Fig. 7) upon a gear 89 fixed to a shaft 90 which passes through the pedestal of the machine and carries a miter gear 91 meshing with a complemental miter gear 92 secured to the lower end of the driving shaft 40. This driving shaft is therefore kept in continuous rotation at uniform speed whenever the driving pulley 53 is in rotation, whether the table operating shaft 65 is clutched to the pulley or not. The shaft 90 also forms part of a slow speed drive for the table feed, of which the balance comprises a pinion 93 fixed to said shaft 90, a gear 94 and pinion 95 secured together, a gear 96 meshing with the pinion 95, and a clutch 97 (see Figs. 15 and 16). The connected gears 94 and 95 are removably and adjustably secured in an arm 98 which is adapted to swing about the shaft 90 (Fig. 15) and to be secured in any angular adjustment within the limits permitted by a slot 99 in the end of the arm, through which a bolt 100, having a clamping nut on its end, projects. These adjustments permit changing of the gears so as to vary the speed ratio between the shaft 90 and the clutch 97. This clutch, with which the gear 96 is non-rotatively connected (as shown in Fig. 16) is in axial alinement with the shaft 65 and is preferably made as a sleeve which receives the end of such shaft. One end is enlarged to form a drum 101 which surrounds a cylindrical head 102 rigidly secured upon the shaft 65. This head is provided with notches 103 in its periphery, containing rollers 104, the diameter of such rollers being less than the length of the notches, and less than the depth thereof at their deepest points, but greater than their depth at their shallower ends. These parts constitute a roller clutch so formed as to permit rotation of the shaft clockwise (as seen in Fig. 17) at a speed faster than that of the clutch drum, but to cause the drum to be clutched to the shaft when rotating in the same direction at a greater rate of speed than the shaft. Thus when the positive clutch 62 is in operative condition, the shaft 65 is driven at the speed of the pulley 53, in other words, at its highest speed, and the clutch 97 is automatically rendered inoperative. When the clutch 62 is disconnected the clutch 97 automatically becomes operative as soon as the speed of rotation of the shaft 65 becomes as slow as that of the clutch 97. The pinion 61 carrying the clutch teeth 62 and the clutch 97, however, are kept in continuous rotation while the pulley is rotated.

The clutch 64 is automatically engaged with and disengaged from the pinion 61 by means of a clutch shifter 105, (shown particularly in Figs. 9 and 10) which is secured upon a rock shaft 106 and has a stud or roll 107 which occupies a groove 108 in the clutch 64. To the rock shaft 106 is also connected an operating lever 109 having a handle 110 by which it may be manually operated, and having also lips 111 and 112 arranged to be engaged by dogs 113 and 114 on a disk 115 to accomplish shifting of the clutch automatically. The disk is mounted beside the lever 109 on a shaft 116, which shaft also carries a worm wheel 117 in mesh with a worm 118 on a shaft 119. The latter shaft is contained in the gear box 57 and carries a pinion 120 which meshes with a pinion 121 secured upon the shaft 65. As the latter shaft rotates, the gears 121, 120, worm 118 and worm wheel 117 drive the disk 115 at a slow rate of rotation and bring the dogs 113 and 114 into engagement alternately with the lips 111 and 112 respectively. When the dog 113 engages the lip 111 the clutch is shifted into connection with the pinion 61, and the dog then passes the lip. Thereafter the dog 114 strikes the lip 112 and shifts the lever and clutch into the other position, where the clutch is disengaged. The clutch shifter is held in each of its positions and also is moved to the extreme limits of its travel in each direction by a latch 122 (Figs. 9 and 10) contained in a socket 123 and having a V-shaped end pressed toward and into engagement with a roll 124 on the clutch shifter by a spring 125 in the socket. The latch is pushed back against the spring in the first half of the travel of the shifter, and after the shifter has passed the point of the latch, the latter moves it and the lever 109 fully to the end of its travel. Thus full travel of the clutch shifter and the actuating lever is insured, and the clutch is yieldingly secured either in or out of operative position. The dogs 113 and 114 travel in different paths, as shown in Fig. 1, and the lips 111 and 112 are located at different distances from the center of the disk 115. Hence the dog 113 alone is able to engage the lip 111, and only the dog 114 can engage the lip 112. The dogs are adjustable upon the disk 115 and for this purpose are provided with heads which occupy undercut concentric grooves 126 and 127 in the face of the disk. In this way the work table actuating shaft 65 in its rotation causes the high speed driver 61 to be alternately connected and disconnected, and during the periods of disconnection the slow speed clutch 97 automatically becomes operative. The dogs 113 and 114 may be set at the points necessary to cause the high speed drive to become effective, while the table is being turned to index the work, and to cause the slow speed drive to become effective during the feeding movement of the table. This capability for adjusting the dogs also allows the time during which the slow speed drive is effective to be varied, and thereby limited to the extent of feeding movement of the table during which the tools engage the work.

The work-gripping means 2 may be of any suitable character, and are detachably and adjustably secured upon the table 1, the latter having a circular undercut groove 128 in its top face for the purpose. The work grippers form parts of the work-holder, of which the table 1 is another part, and wherever in this specification and in the following claims I have used the term "workholder" I intend to include any kind of a holder adapted to support one or more work pieces, and in this term are included the table and the grippers. The term "toolholder" in the broadest sense in which it is used is intended to cover holding means such as the head 10 or its equivalent, capable of supporting one or more operating tools, as well as the tool spindle which forms a part of the tool-holder means, and is the element which directly engages and supports the operating tool.

The foregoing description has shown that the individual work pieces are operated upon by the several tools in turn, and also that the tools may be each independently adjusted both toward and from the column and around the column, being thereby made capable of operating upon any part of the work piece. In consequence, the several tools may all be caused to act upon one work piece at the same point, or position, or at a common center; or they may be caused to act at different points at any desired distance apart and in any desired relative positions on the work piece, even though the zone of operation in the work piece, of one tool may overlap, without being concentric or coaxial with the zone of operation of another tool. In other words, the coaction between the relative indexing and feeding movements of work holder and tool holder and the capacity for universal adjustment of the tools permits of the performance in one machine of a connected series of operations on the same work piece, which operations may either be concentric, or eccentric to any degree and in any direction.

I do not limit the invention to the precise construction and arrangement of parts and elements here shown, or otherwise, except as required by the scope of the claims.

I claim,—

1. A machine tool comprising a tool holder, a plurality of tools supported by said holder, a work holder, means for producing relative indexing and feeding movements between said holders to cause action of the tools successively on a work piece, and means whereby said tools may be adjusted in any direction transverse to the direction of feeding movement.

2. A machine tool comprising a tool holder, a plurality of tools supported by said holder, a work holder, means for producing relative indexing and feeding movements between said holders to cause action of the tools successively on a work piece, and means whereby one of said tools may be adjusted transversely with respect to the direction of feeding movement to act either at the same point of the work piece as another tool, or at a different point.

3. A machine tool comprising a tool holder, a plurality of tools supported by said holder, a work holder, means for producing relative indexing and feeding movements between said holders to cause action of the tools successively on a work piece, and means whereby the tools may be set to act all on the same point or center of the work piece, or at different points.

4. A multiple spindle machine including a central column, a work-holding table movable rotatably about such column and also longitudinally of the same, a head mounted upon the column, a plurality of tool spindles secured to said head and extending toward the work table, mechanism for so moving said table as to put the same work piece in position to be acted on by the several tools successively, and provisions whereby each of said tool spindles may be adjusted toward and from the column.

5. A multiple spindle machine including a central column, a work-holding table movable rotatably about such column, and also longitudinally of the same, a head mounted upon the column, a plurality of tool spindles secured to said head and extending toward the work table, mechanism for moving said table step by step around the column to bring the work successively to the several tools, and provisions whereby each of said tool spindles may be adjusted around the column.

6. A multiple spindle machine including a central column, a work-holding table movable rotatably about such column and also longitudinally of the same, a head mounted upon the column, a plurality of tool spindles secured to said head and extending toward the work table, mechanism for moving said table step by step around the column to bring the work successively to the several tools, and means for adjusting said spindle head toward and from the table.

7. A machine tool including a column, a work-holder and a tool-holder both mounted upon said column, and nuts threaded upon the column on both sides of the tool-holder operable to adjust the same toward and from the work-holder.

8. In a machine tool of the character described, a column, a work carrier movable step by step about the column and movable also longitudinally thereof, a tool-carrying head mounted upon said column and having separated lips surrounding the column, guides held between said lips and adjustable thereon around the column, said guides having passages substantially radial to the column, releasable clamping means for securing the guides upon the lips in different positions, tool spindle holders passing through the passages of the several guides and being adjustable longitudinally of said passages, and means for clamping said spindle holders in the guides.

9. In a machine tool a tool-holding head having a tool spindle guide provided with an elongated passage, a spindle sleeve extending through the passage transversely thereof and being of less width than the length of the passage, and adjustable clamping means mounted upon said sleeve on opposite sides of the guide and operable to grip the guide between them, said clamping means being adjustable to vary the position, relatively to its own length, of the sleeve in the guide.

10. In a machine tool a tool-holding head having a tool spindle guide provided with an elongated passage, a spindle sleeve extending through the passage transversely thereof and being of less width than the length of the passage, and adjustable clamping means mounted upon said sleeve on opposite sides of the guide and operable to grip the guide between them, said clamping means including filling pieces adapted to be placed upon the sleeve on either side of the guide, whereby the sleeve may be clamped in different longitudinal positions.

11. In a machine tool a work holder having means for securing a number of work pieces arranged about a central axis, a tool holder, a plurality of tools mounted on said tool holder and also arranged about the same central axis with a spacing corresponding substantially to that of the several work pieces, means for producing intermittent indexing rotation of one of said holders about such axis and for producing relative movement between the holders longitudinally of such axis in the pauses of the indexing rotation, to cause operation by the tools in succession on the same work pieces, and means whereby said tools may be adjusted independently in the tool holder so as to act on the same work piece either at a common center or at different centers any desired distance apart.

12. In a machine tool a work holder having means for securing a number of work pieces arranged about a central axis, a tool holder, a plurality of tools mounted on said tool holder and also arranged about the same central axis with a spacing corresponding to that of the several work pieces, means for producing intermittent indexing rotation of one of said holders about such axis and for producing relative movement between the holders longitudinally of such axis in the pauses of the indexing rotation, to cause operation by the tools in succession on the same work pieces, and means whereby said tools may be adjusted in and out with respect to said axis, and angularly about such axis.

13. In a tool of the character described, a tool head including a guide having a longitudinal passage, a spindle holding sleeve extending transversely through said passage and having abutments on opposite sides of the guide, one of which abutments is adjustable longitudinally on the sleeve, and removable filling pieces interposed between either or both of said abutments and the guide, said filling pieces determining the longitudinal position of the sleeve in the guide accordingly as they are on one side or the other of the guide.

14. In a machine tool having a work holder adapted to carry a plurality of work pieces and mounted with provision for intermittent rotary indexing and axial feeding movements, a tool holding head in alinement with said work holder in the feeding direction, tools mounted in said head in approximate alinement in the feeding direction with the several work pieces carried by the work holder, means whereby said tools may be adjusted transversely of the lines of feeding of the respective work pieces, a driving spindle for each tool, means for rotating said spindles, and flexible shafting connecting each of said spindles with its respective tool constructed and arranged to permit such adjustment of the tools.

15. In a machine tool having a work holder adapted to carry a plurality of work pieces and mounted with provision for intermittent rotary indexing and axial feeding movements, a tool holding head in alinement with said work holder in the feeding direction, tools mounted in said head in approximate alinement in the feeding direction with the several work pieces carried by the work holder, and means whereby said tools may be adjusted around the axis of the indexing rotation to make the angular distance about such axis between two adjacent tools greater or less than the angular extent of each step of such indexing movement.

16. In a machine tool having a work holder adapted to carry a plurality of work pieces and mounted with provision for intermittent rotary indexing and axial feeding movements, a tool holding head in alinement with said work holder in the feeding direction, tools mounted in said head in approximate alinement in the feeding direction with the several work pieces carried by the work holder, means whereby said tools may be adjusted around the axis of the indexing rotation to make the angular distance about such axis between two adjacent tools greater or less than the angular extent of each step of such indexing movement, a driving spindle for each tool, means for rotating said spindles, and flexible shafting between said adjustable tools and the corresponding spindles, constructed and arranged to permit such adjustment of the tools.

17. In a machine tool having a work holder adapted to carry a plurality of work pieces and mounted with provision for intermittent rotary indexing and axial feeding movements, a tool holding head in alinement with said work holder in the feeding direction, tools mounted in said head in approximate alinement in the feeding direction with the several work pieces carried by the work holder, means whereby said tools may be adjusted inwardly and outwardly with respect to said axis, a driving spindle for each tool, and flexible shafting between each adjustable tool and the corresponding driving spindle constructed and arranged to permit such adjustments of the tool.

18. In a machine tool having a work holder adapted to carry a plurality of work pieces and mounted with provision for intermittent rotary indexing and axial feeding movements, a tool holding head in alinement with said work holder in the feeding direction, tools mounted in said head in approximate alinement in the feeding direction with the several work pieces carried by the work holder, means whereby said tools may be adjusted transversely of the lines of feeding movement of the respective work pieces, a driving shaft located in the axis of said indexing movement, driving spindles arranged about said shaft, a plurality of gears on said shaft, gears on the respective spindles meshing with the shaft gears, said gears being changeable, means whereby said spindles may be adjusted with respect to said shaft, and extensible and flexible shafting extending from each of said spindles to the corresponding tools for transmitting rotation to the latter and permitting such adjustments of the tools and spindles.

19. In a machine tool having a work holder adapted to carry a plurality of work pieces and mounted with provision for intermittent rotary indexing and axial feeding movements, a tool holding head in alinement with said work holder in the feeding direction, tools mounted in said head in approximate alinement in the feeding direction with the several work pieces carried by the work holder, means whereby said tools may be adjusted transversely of the lines of feeding movement of the respective work pieces, a driving shaft located in the axis of said indexing movement, driving spindles arranged about said shaft, a plurality of gears on said shaft, gears on the respective spindles meshing with the shaft gears, said gears being changeable, and means whereby said spindles may be adjusted with respect to said shaft, toward and away from the shaft and in the direction of the axis thereof to permit meshing of different gears on the spindle with different gears on the shaft.

20. A multiple spindle machine tool comprising a tool-holder, a plurality of tools supported thereby, a work-holder movable rotatably transversely of said tools and also rectilinearly toward and from the latter, a rotary cam for effecting both such movements of the work-holder, and driving mechanism for said cam, including plural speed gearing adapted to drive said cam with a relatively slow motion, while the work is being performed, and with a relatively rapid motion when the work-holder is moving free of the tools.

21. A multiple spindle machine tool comprising a tool holder, a plurality of tools supported thereby, a work holder movable rotatably transversely of said tools for indexing and also rectilinearly toward and away from the latter for feeding, means whereby said tools may be adjusted transversely of the feeding direction, means for giving the said rotary and rectilinear movements to said work holder, and means for causing the feeding movements of the work holder to be relatively slow and the other movements thereof to be relatively rapid.

22. In a machine tool having a work-holder, a tool-holder, a plurality of tools carried by said tool-holder, each adjustable over the work carried by said work-holder, and a single cam operative both for indexing one of said holders relatively to the other and for feeding the same toward the other, a driving mechanism for said cam including a relatively high speed driver and a relatively low speed driver, and automatic mechanism for causing the low speed driver to become operative while the work movement is in progress, and for causing the high speed driver to act when the indexing movement occurs.

23. In a machine tool of the character described having a work-holder and a tool-holder, a plurality of operating tools carried by said tool holder, each adjustable across the face of the work-holder, a cam for indexing and feeding one of said holders, a worm and wheel mechanism for rotating said cam, a prime driving element, a disconnectible clutch arranged to effect direct engagement between the worm and wheel mechanism and the prime driving element, a reducing gear train constantly driven by the prime element, and a clutch driven by said train having means for effecting automatic connection with the worm and wheel mechanism when the first-named clutch is disconnected.

24. In a machine tool a rotatably and rectilinearly movable work table, a tool-holder, operating tools carried by said tool-holder adjustable across the face of said table, driving mechanism for moving said table rotatably to index the work and rectilinearly to feed the work, said mechanism including high speed and low speed drivers, and means controlled by the table driving mechanism for causing the drivers to become operative in alternation.

25. In a machine tool a rotatably and rectilinearly moving work table, a tool-holder, rotatably operating tools extending toward said table, each adjustable transversely of its axis of rotation, driving mechanism for moving said table rotatively to index the work and rectilinearly to feed the work, said mechanism including high speed and low speed drivers, and means controlled by the table driving mechanism for causing the drivers to become operative in alternation, said means being adjustable to vary the relative durations of the high speed and low speed movements of the table.

26. A machine tool having a work-holder and a tool-holder, one of which is movable rotatably for indexing and also rectilinearly toward and from the other for feeding, a spring-actuated stop bearing against a part of said holder, for arresting the rotary indexing movement thereof, such part having an abutment arranged to coöperate for the purpose with said stop, and a pawl pivotally connected to the holder arranged to displace said stop upon return of the holder from its rectilinear feeding movement.

27. In a machine tool having a tool holder and a rotatably and rectilinearly movable holder provided with a guiding member for guiding its rectilinear movement, a stationary guide adapted to coöperate with said guiding member, a yielding stop bearing against a portion of the holder, said portion having an abutment arranged to coöperate with said stop in arresting the rotary movement of the holder when the guiding element and guide are in alinement, said stop being arranged and operated to follow the rectilinear movement of the holder until the guiding element and guide have come into engagement.

28. In a machine tool having a rotatably and rectilinearly movable holder, a ring having sockets secured to said holder, a stop adapted to coöperate with said sockets to arrest rotary movement of the holder, yielding means pressing said stop in a direction parallel to the rectilinear movement of the holder against said ring in the path of movement of such sockets, a stationary guide parallel to the direction of rectilinear movement of the holder, coöperative guiding elements associated with the holder and so arranged that when one of the sockets is engaged with the stop, one of said guiding elements is in operative alinement with the guide, said stop being actuated by said yielding means to follow the holder at the commencement of its rectilinear movement and prevent displacement of the same until the guiding element has engaged the guide.

29. In a machine tool of the character described, a rotatably and rectilinearly movable holder having sockets, a stop constructed to enter said sockets, yielding means pressing the stop against that portion of the holder in which the sockets are located, and a displaceable dog pivoted to the holder arranged to be displaced by the stop in the rotary movement of the holder, and to displace the stop in the return rectilinear movement of the holder.

30. In a machine tool, a tool holder, a work holder, one of said holders being rotatably movable for indexing and axially movable for feeding, a stop pressing yieldingly against said movable holder in the direction of feeding movement of the latter, a stationary guide parallel to the feeding movement of the movable holder for guiding the latter in such movement, an abutment on the movable holder located to engage said stop and be arrested thereby when said holder arrives in the course of its indexing movement in position to co-act with said guide, said stop being movable in said feeding direction and means whereby the movable holder on its return from feeding displaces said stop from the path of said abutment.

In testimony whereof I have affixed my signature, in presence of two witnesses.

GEORGE O. GRIDLEY.

Witnesses:
C. F. GULLIVAN,
N. F. TROWBRIDGE.